United States Patent
Wheeler et al.

(10) Patent No.: US 11,315,171 B2
(45) Date of Patent: Apr. 26, 2022

(54) METHOD FOR IN-STORE PRODUCT FULFILMENT IN A RETAIL STORE HAVING A RETAIL DISPLAY SPACE

(71) Applicant: First Retail Enteractive Ltd., Victoria (CA)

(72) Inventors: Nolan Wheeler, Victoria (CA); Justin A. Young, Victoria (CA)

(73) Assignee: FIRST RETAIL ENTERACTIVE LTD., Victoria (CA)

( * ) Notice: Subject to any disclaimer, the term of this patent is extended or adjusted under 35 U.S.C. 154(b) by 0 days.

(21) Appl. No.: 17/151,602

(22) Filed: Jan. 18, 2021

(65) Prior Publication Data
US 2021/0224882 A1    Jul. 22, 2021

(30) Foreign Application Priority Data
Jan. 18, 2020   (CA) ................................. CA 3068820

(51) Int. Cl.
*G06Q 30/06* (2012.01)
*G06Q 20/20* (2012.01)
*G06Q 10/08* (2012.01)
G06Q 30/02 (2012.01)

(52) U.S. Cl.
CPC ....... *G06Q 30/0635* (2013.01); *G06Q 10/087* (2013.01); *G06Q 20/20* (2013.01); G06Q 30/0255 (2013.01)

(58) Field of Classification Search
CPC .. G06Q 30/0635; G06Q 20/20; G06Q 10/087; G06Q 30/0255; G07F 9/002; G07F 9/023; G07G 1/0009
USPC .......................................................... 705/16
See application file for complete search history.

(56) References Cited

U.S. PATENT DOCUMENTS

| | | | |
|---|---|---|---|
| 11,176,602 B2 | 11/2021 | Sorensen | |
| 2020/0104786 A1* | 4/2020 | Mork | .................... G06Q 10/087 |
| 2020/0348988 A1* | 11/2020 | Min | .................... G06Q 30/0643 |

* cited by examiner

*Primary Examiner* — Garcia Ade
(74) *Attorney, Agent, or Firm* — Alleman Hall Creasman & Tuttle LLP

(57) ABSTRACT

A method for in-store product fulfilment in a retail store having a retail display space and an inventory station in an inventory area where expensive products are stored to avoid theft and bulky products are stored to conserve retail display space. The method involves a step having an electronic request for a product being sent directly from an in-store customer in the retail display space. This electronic request is directed to the inventory station. The method involves a step of having the inventory station send an order confirmation to the in-store customer acknowledging the electronic request, confirming to the in-store customer that the product is available in inventory and directing the customer to proceed to a designated pick up point at the conclusion of their shopping.

10 Claims, 2 Drawing Sheets

METHOD FOR IN-STORE PRODUCT FULFILMENT IN A RETAIL STORE HAVING A RETAIL DISPLAY SPACE

FIELD

There is described a method for in-store product fulfilment in a retail store having a retail display space system.

BACKGROUND

Retail brick and mortar have faced considerable challenges to their industry over the past decades. One of those challenges is the exponential increase in retail crime, including organized retail crime. Further exacerbating theft, is that the retail value (retail selling price) of the item have increased. The result is that with a higher instance rate of theft, multiplied by a higher retail value (quantitative dollar value of the item) the cost to retailers is ever greater. This not only provides greater incentives for theft and groups benefiting from retail crime, but causes the retailer to take loss prevention strategies that can become negative to customer experiences.

As result of the factors listed above, retailers have been forced to lock up or remove from the public sales floor many of the high value goods in the retail location. The size or cubic saturation of the warehouse has increased relative to the size of the retail public sales floor. Anything from 'locking show cases', demo items only on display, and a demand for extended assortments is causing modern retailers to keep more items locked up, behind closed retail warehouse doors, and behind counters. Not only does this lead to a potentially frustrating consumer experience associated with the requirement of either finding a retail staff, requesting help via a 'call button', etc., it also removes the ability for the every-day consumer to observe 'on hand' inventory. In other words, not only does this lead the customer to a delayed business transaction, but they must find a retail staff member to even identify if that item is 'in-stock'. The necessity to ensure in-stock condition is unique to these retail facilities and is not observed in various other businesses. In any retail situation whereby a consumer finds their item behind locked glass, that consumer must now find an associate to unlock the case, that associate may need to find a manager with keys for that showcase, and in many instances the store may then have to retreat to the warehouse to find the item elsewhere. Warehouse practices and technologies have also changed. Where once any associate could access the warehouse, there are now restrictions on who can access the warehouse due to a variety of health and safety concerns, up to and including the addition of mechanical sortation and storage equipment requiring various safety precautions and training. The problem has been exacerbated by the COVID-19 pandemic as there are less staff per customer as a ratio, there are barriers to effective communication such as masks and Plexiglas barriers, and perhaps even a consumer reluctant to interact with humans.

Various solutions have been developed to assist in providing in-stock condition to retail consumers, however, there is an inherent requirement for the data integrity of that in-store inventory to facilitate that customer experience and sale. Retail stores struggle with their data integrity, attributable by example to theft or secondary locations. However, there are many other scenarios whereby the integrity is impacted, such as items that are 'open box', damaged, or otherwise not fully as described. This problem outlined above, means that not only can a consumer be further frustrated by an item showing 'in stock' but that item being unable to be located, or 'not as described' as outlined above. This causes a dependency and 'dwell' that the consumer must now patiently observe while they await the retailer's process of locating and confirming the availability of the item as 'described' or expected.

Traditionally, an item not available in store, out of stock, or otherwise, would potentially result in the issuance of a 'rain check'. This rain check would secure the price of the item for a specified period of time, specified quantity, under replenishment or availability of the product was restored. This leads to loss of sales, abuse of pricing methodologies, consumer arbitrage, frustration or disenfranchisement of the consumer or otherwise.

Further, the problem with locking items behind showcase glass and in warehouse secure storage is that it limits the ability for today's time-sensitive customer for a quick and rewarding transaction. This frustration of finding more and more items behind locked glass and cages has lead the modern savvy consumer to take their retail business online.

Even when these items are found and provided to the consumer, many retailers then invoke a 'lock it up, walk it up' strategy, whereby the associate, perhaps suggestively, 'escorts' the customer to the point of sale. Not only can this be uncomfortable and an additional added labour cost to the retailer, but the customer now lacks the ability to further shop, and perhaps be influenced by merchandising and influence pricing and placement.

In other examples, the item might be in the warehouse not because of loss prevention, but because of the items bulky packaging, or form factor that makes the items difficult for traditional retail shelving. For example, these could be items such as patio sets, 'flat pack furniture', or specialty items or items with low inventory turn. In any case, the experience to the customer applies the same as the above, find staff, wait, and have enough patience to see the entire transaction to the end.

Further, and in-line with the online challenge and thus omni-response from retail, retailers are becoming distribution centres and online pickup facilities for their online business.

As a result, many items are now being stocked in warehouses to support that online model, these items are not merchandized on the floor due limitation of space (lineal shelving). The retailer, having acquired these items to support online distribution are then not capitalizing upon the availability of those items for in-store, brick and mortar shoppers. The concept of having additional items in the warehouse to support in-store shoppers is categorized by some as 'endless aisle'.

Retailer stores have a great number of SKU in their final product state. The number of SKU's (Stock Keeping Units) a retailer holds has also increased over time. Retailers have extended their assortment, selection, of items, in order to better serve the customer. This inherently creates a risk that the product requested is not available. The item may be out of stock, or the staff may be unable to locate the product and thus lose the transaction. As such, this impacts when the business can reasonably accept payment. The retailer is only able to charge the credit card once the transaction completes because we were able to locate the product.

Furthermore, in many retail scenarios, for example those found in weighed or otherwise measured item retail, the final value of the total transaction, despite possible out of stocks and project substitutions is not known until weight-based transactions are completed.

There are identified instances of 'cards' or 'chit's that retailers use as proxy placeholder for items. In this solution, the consumer physically acquires a card or token associated to the item that they want, and once at POS, would present the proxy that is then entered or scanned into the POS. However, this is then the first demarcation that the retailer observed line of sight to the consumer's request. The 'clock' then only starts at the transaction level for the retailer to locate and bring that requested product to a location of hand over, or 'customer pick' or 'loading zone'. Inherent in the design of such, an inevitable delay occurs.

Comparing Brick and Mortar to online, the online retailer has the innate ability to 'electronically merchandise' or associated sell secondary, tertiary or like-items to the consumer. This overcomes traditional retail space allocations whereby items are placed outside of aisles, categories, or even business units. Brick and Mortar retail cannot effectively convey, offer or incentivise to the consumer these options. Thus, this creates a disadvantage to Brick and Mortar competing, retaining or advancing against online consumer channels. Last, online retailers have an inherent advantage over brick and mortar stores over many of the issues listed above, such as in-store theft, customer liability, efficiencies of storage (items do not have be merchandised or broken down).

SUMMARY

According to the invention there is provided a method for in-store product fulfilment in a retail store having a retail display space and an inventory station in an inventory area where expensive products are stored to avoid theft and bulky products are stored to conserve retail display space. The method involves a step having an electronic request for a product being sent directly from an in-store customer in the retail display space. This electronic request is directed to the inventory station. The method involves a step of having the inventory station send an order confirmation to the in-store customer acknowledging the electronic request, confirming to the in-store customer that the product is available in inventory and directing the customer to proceed to a designated pick up point at the conclusion of their shopping.

The above-described method allows a consumer to purchase products in traditional retail, without having to find a sales associate or participate in an additional process, whereby the result, is the item(s) the customer desires are procured from warehouse or security area and brought to an in-store pickup location.

This approach differs dramatically from the conventional approach in which the in-store customer initiates a purchase by attending the POS station to make payment. It is unheard of for the in-store customer to initiate communication directly with warehouse staff and for the warehouse staff to be initiating the pulling of products from inventory without the prior payment or involvement of the POS station. This approach reduces customer dwell time by creating efficiencies within a retail environment, resulting in a more satisfying overall customer experience.

Further, compare this to the traditional 'chit' system whereby not only is there a high risk assumption that inventory is available (reconciliation of chit to inventory is not logistically possible), but in that chit example, the store associate is only notified to begin picking the order once payment has been made, the customer now forced to wait, and perhaps the item is in-fact out of stock and now a refund is required.

The customer is able to interact with digital locking show cases, navigational tablets, or their own handset or other technology, such as, but not limited to, QR code and the like, for items otherwise found locked up, of large or odd-sized, or otherwise found in warehouse or security area. The customer can determine in-location the item(s) they desire, and digitally request those items to be called from warehouse or security area. It should be noted that items stored in warehouse or security area can have numerous origins such as: Health and Safety, Dangerous Goods storage, High Cube storage, OTC storage, High Value storage, High Risk storage, etc.

In real-time, the store associates and cashier or point of sale, if necessary (including customer handset and/or other technologies) can procure items from warehouse or secure location, and stage/arrange for those items at point of sale, in-store pickup, or other logical area within the system. The customer can then track the procurement of the item(s) in real-time, via their smart phone, or via various screens situated in the store, advising the customer of the current status of their request.

The system works based on the customer providing, or linking, a unique identifier to their request(s) and that unique identifier being utilized by a POS methodology whereby the items are entered into the transaction. This could be the only item(s) of the transaction or this could be added to an existing or traditional scanned POS retail transaction.

Simultaneously and in-real time, a queue, notification or similar method starts a warehouse procurement process for that specific item, associated with that specific request and unique identifier of the customer.

When the customer request is linked via a POS method, in-real time, a queue, notification or similar method has that staged item brought to a customer pickup area or to the POS lane or terminal that initiated the POS transaction and thus the request.

That request is then removed from the system of digitally requested products.

During any part of this system, the retailer can then extend the relationship to the customer, via electronic merchandising, associated selling or otherwise. This could include, but not be limited to endless aisle, associated selling, service and warranty, loyalty, incentives, forms of payment and/or delivery.

During any part of the system, the retailer can engage the customer with respect to not only the status of their request, but additional offers aforementioned.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

The method for in-store product fulfilment in a retail store having a retail display space will now be described with reference to FIG. 1 and FIG. 2.

Figure 1:
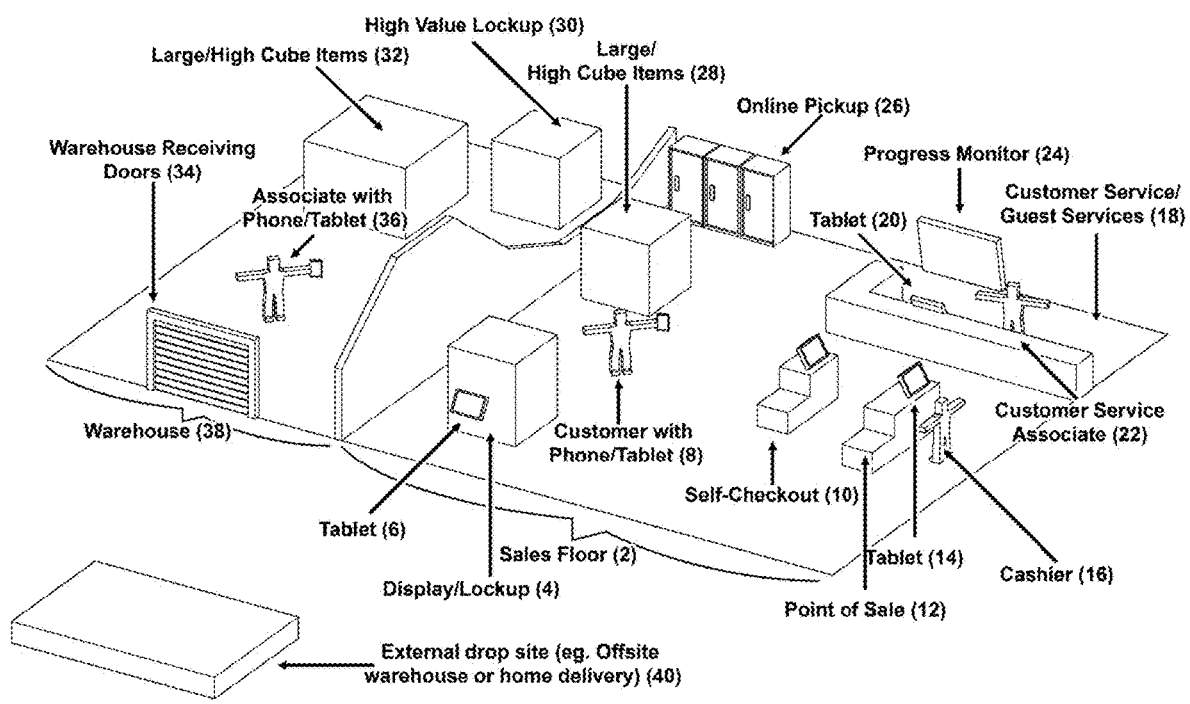
FIG. 1 is a Block Diagram of a retail store.

Structure and Relationship of Parts:

Referring to FIG. 1, there is illustrated the layout of a retail store having a retail display space 2, also referred to as a "sales floor". Positioned on retail display space 2 is an electronic Point of Sale (POS) station where a customer 8 goes to pay for a product he or she wishes to purchase. This can be a self-checkout POS station 10 or a POS station 12 manned by a cashier 16.

There is also an inventory station, typically a warehouse area 38, where expensive products 30 are stored to avoid theft and bulky products 32 are stored for which there is not room to display in retail display space 2. Customers, such as customer 8, is not allowed into warehouse area 38. In addition to security reasons, customer 8 is also excluded from warehouse area 38 for safety reasons as palletized shipments of goods are frequently received at warehouse receiving doors 34 and forklifts are often used to move such palletized shipments within warehouse area 38. There will always be one or more warehouse associates 36 working in warehouse area 38.

There will be a wide variety of products displayed in retail display area 2. The products which are of particular interest and which will be the focus of this description are products which are in locked display cases 4 and bulky products, sometimes referred to as "large cube items" 28.

The reason the products are in locked display cases 4 may be fear of theft. There are a number of products kept in locked display cases, such as jewellery, cameras, electronics and power tools; to name just a few. The reason the products are in locked display cases 4 may also be related to safety or government regulation. For example, government regulations regarding the safe storage of firearms and ammunition.

Large cube items 28 are bulky items that take a relatively large area of retail display space 2. In such cases, there are one or two display models and the products that are for consumer purchase are kept in warehouse area 38. An example, of a large cube item would be lawn furniture.

In order to facilitate the method, which will hereafter be described, a communications device illustrated as tablet 6 has been placed at locked display case 4 and large cube items display 28. Warehouse associate 36 is also equipped with a communications device, illustrated as a tablet. POS station 12 will also have a communications device, illustrated as tablet 14. Customer service/guest services station 18 will also have a communications device, illustrated as table 20. Of course, the customer may have his or her own communications device.

Operation:

Referring to FIG. 1, an electronic request for a product is sent from in-store customer 8 in retail display space 2. Customer 8 may initiate this request from his or her own communications device or may use one of tablets 6 which are conveniently located in retail display space 2 at locked display case 4 and large cube item display area 28. In some variations, tablet 6 may be represented by a QR code, other Unique Identifier, or link. This electronic request is directed by to warehouse associate 36 at the inventory station within warehouse area 38.

Warehouse associate 36 at the inventory station sends an order confirmation to in-store customer 8 acknowledging the electronic request, confirming that the product is available from inventory and advising in-store customer 8 to proceed to a designated pick up point at the conclusion of their shopping.

In-store customer 8 is given the option of paying electronically or going to POS Station 12 to make payment.

When customer 8 selects making payment at POS station 12, warehouse associate 36 at the inventory station sends an order notification to tablet 14 at POS station 12 advising of the electronic request from in-store customer 8. Warehouse associate 36 also confirms that the product is available, and that the product is in the process of being pulled from inventory within warehouse area 38 to a designated pickup point for the product, shown as locked pickup 26.

Once cashier 16 at POS station 12 has processed payment from in-store customer 8, in-store customer 8 is directed to designated pick up point. In this instance, locked pickup 26 positioned adjacent to customer service/guest services area 18. This allows customer service associate 22 to attend to in-store customer 8. As selected goods are placed in locked pickup 26, their availability is displayed on progress monitor screen 24. It will be understood that there may be a delay while in-store customer 8 completes his or her shopping.

Once in-store customer 8 goes to customer service/guest services area 18, he or she presents a proof of payment and customer service associate 22 provides in-store customer 8 with the selected product from locked pickup 26.

Figure 2:
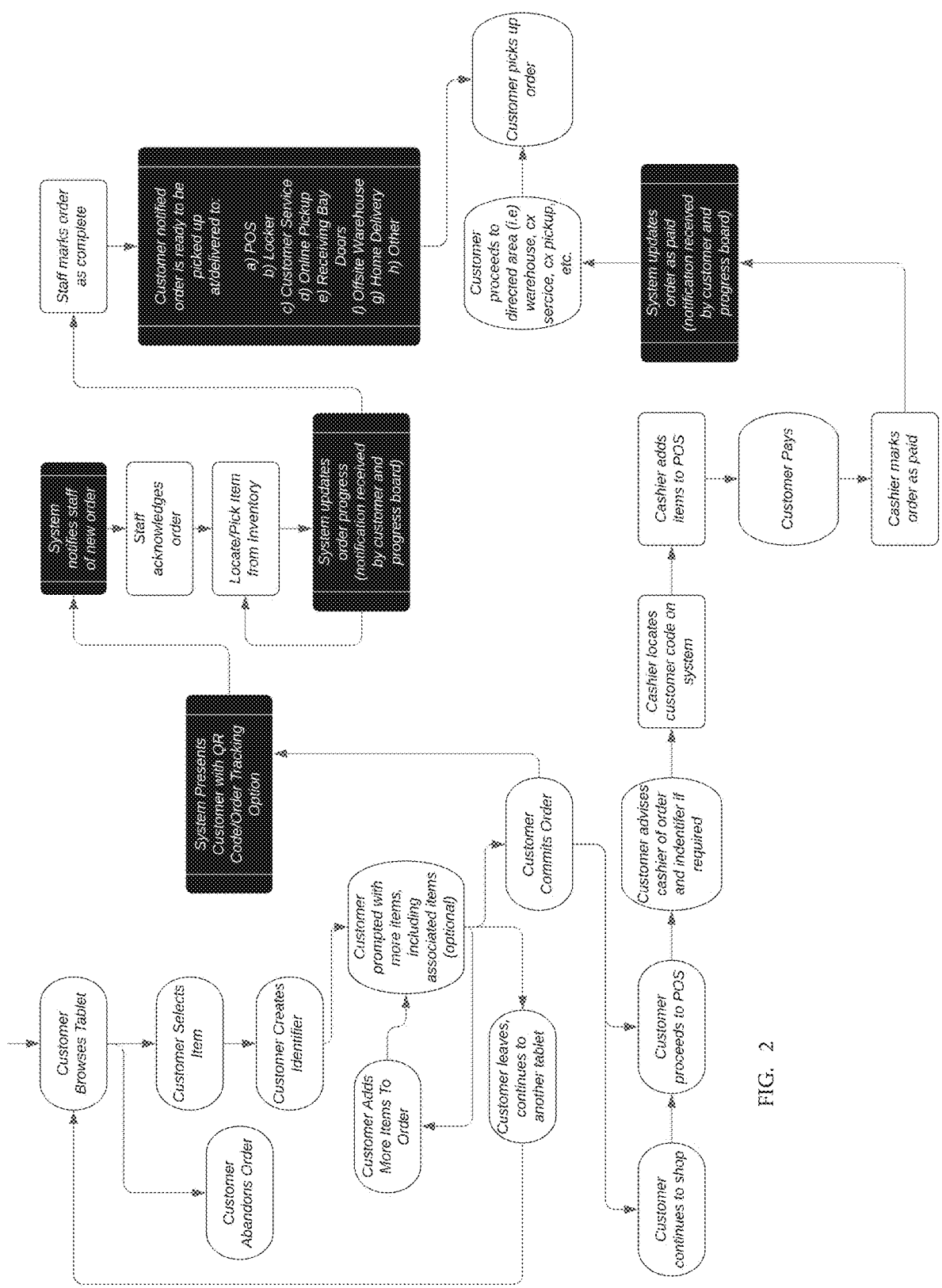
FIG. 2 is a Flow Diagram setting forth the method as it relates to FIG. 1.

Referring to FIG. 2, the experience of in-store customer 8 is shown in the form of a flow chart. The process starts with the customer browsing. We will assume that in-store customer 8 is browsing on their personal device or tablet 6 and looking for a product of interest viewed in locked display case 4. In-store customer 8 then selects the product of interest. The customer is then prompted to create a customer identifier prior to placing an order (for example 2-3 character temporary username). In-store customer 8 is further prompted with an opportunity to purchase related or complementary products, along with the product of interest. In-store customer 8 then is given the option to commit to the order or to leave the process and return to browsing tablet 6. Once in-store customer 8 commits to an order, in-store customer 8 is given an order tracking code. In-store customer 8 is also given the option of receiving progress notifications to their personal phone. Depending upon their privacy concerns, in-store customer 8 may or may not chose to take the progress notification option. Warehouse associates 36 receive notification of the order received from in-store customer 8. One of warehouse associates 36 then acknowledges the order to in-store customer 8 and assumes the task of locating and removing the selected product from inventory. The systems updates order status on progress monitor screen 24 and, if authorized by in-store customer 8, sends progress notifications directly to the communications device of in-store customer 8.

Once warehouse associate 36 has completed the task of pulling the selected product and delivered it to the designated pickup area 26, progress monitor screen 24 is updated and, if authorized by in-store customer 8, a further progress notifications is sent directly to the communications device of in-store customer 8.

Once in-store customer 8 has completed his or her shopping, he or she proceeds to POS station 12. In-store customer 8 advises cashier 16 of the customer order identifier for the order. Cashier locates the customer order identifier on tablet 14 and enters the transaction into POS station 12. Unlike existing retail logistics, nothing has been entered into POS station 12 to this point. In some variations of the system, the POS tablet may not exist such as in a system wherein the customer utilizes the system with QR codes and makes payment through electronic means. However, in another variation of the system, the cashier may scan items in a customer's order using the customer's personal device which may present the items via QR code, sequential bar codes, or other means. In-store customer 8 pays for the selected product, is given a receipt to evidence payment and directed to designated pickup area 26. Cashier 16 also updates the system to reflect the fact that the product has been paid for. Customer service associate 22 will know the product has been paid for prior to being approached by in-store customer 8. The system will have sent notifications to tablet 20 and progress display monitor 24 will have been updated. The purpose of asking to see the receipt is to ensure that the correct item is given to the correct customer and or for validation of payment or risk mitigation.

It will be appreciated that the designated pickup area may vary depending upon the preferred practises of the retail store or may vary depending upon the type of item. Where there is storage available at POS station 12, POS station 12 may serve as the designated pickup area. Where there is storage available at customer service/guest services area 18, customer service/guest services area 18 may serve as the designated pickup area. Where the item is a large piece of furniture, the designated pickup area may be at warehouse receiving doors 34. Where the products purchased are kept as an "offsite" warehouse area, the customer may have to go to the "offsite" warehouse. Where the purchase is too large to fit into the average customer's vehicle, home delivery may be required. It is believed that for most retail stores, a secure dedicated pickup area will be established in close proximity to customer service/guest services area 18.

Without the system described above, a retailer is constrained to locking show cases, request for help or 'call buttons' for an associate to assist with the high theft or large, high cube, or other, item otherwise unavailable on the public retail sales floor.

Variations:

Systems may be wired or wireless, using devices supplied by the retailer, vendor, consumer or 3$^{rd}$ party. The system may have on-site integrations, or depend on web or mobile data.

The system may be stand alone, or may offer additional features such as associated selling, warranty, services, delivery or otherwise.

The system may or may not be integrated into POS.

The system may be limited to physical screens or with the use of integration into a work management platform, or other communicative strategy located on electronic devices that support the retailer and/or consumer.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

In an example, a method for in-store product fulfilment in a retail store having a retail display space and an inventory station in an inventory area where products are stored comprises the steps of: an electronic request for a product being sent directly from an in-store customer in the retail display space, the electronic request being directed to the inventory station; and the inventory station sending an order confirmation to the in-store customer acknowledging the electronic request, confirming to the in-store customer the product's inventory status, and directing the customer to proceed to a designated pick up point at the conclusion of their shopping. In an example, the inventory station provides the in-store customer with an option of making electronic payment. In an example, the inventory station provides the in-store customer with an option of making payment at a Point of Sale (POS) station and sends an order notification to the POS station where the in-store customer will be making payment prior to picking up the product from the designated pick up point. In an example, the in-store customer is sent an electronic notification when the product is at the designated pick up point. In an example, the in-store customer receives targeted advertisements of retail purchase offerings, or surveys that are complementary to the product.

In an example, a system for in-store product fulfilment in a retail store comprises: a retail display space in the retail store; an inventory station in an inventory area of a retail store, the inventory area being an area where products are stored; a communications link that enables an in-store customer in the retail display space to communicate directly with the inventory station in the inventory area of the retail store concerning an order for a product on display in the retail display space, the inventory station responding by sending an order confirmation to the in-store customer acknowledging the electronic request, confirming to the in-store customer the product's inventory status, and directing the customer to proceed to a designated pick up point at the conclusion of their shopping.

What is claimed is:

1. A method for product fulfilment in a retail store having a retail display space and an inventory station in an inventory area where products are stored, the method comprising the steps of:
   at a first communications device of the inventory station of the retail store, receiving an electronic request for a product sent from a second communications device operated by a customer, the electronic request being associated with a request-specific identifier created by the customer at the second communications device for the electronic request;
   determining an order status for the electronic request at the inventory station;
   responsive to the electronic request and based on the order status, at the first communications device of the inventory station, sending an order confirmation directed to the second communications device operated by the customer acknowledging the electronic request, confirming to the customer that the product is available in the inventory, and directing the customer to proceed to a designated pick up point for the product;
   receiving the request-specific identifier from the customer at a point of sale device located within the retail store;
   at the point of sale device, adding the product to a transaction for purchase by the customer based on the request-specific identifier received from the customer; and
   completing the purchase of the product at the point of sale device.

2. The method of claim 1, wherein the inventory station sends an order notification to the point of sale device where the customer will be making payment to complete purchase of the product prior to picking up the product from the designated pick up point.

3. The method of claim 1, wherein the second communications device operated by the customer is sent an electronic notification when the product is at the designated pick up point.

4. The method of claim 1, wherein the second communications device operated by the customer receives targeted advertisements of retail purchase offerings, or surveys that are complementary to the product.

5. A system for in-store product fulfilment in a retail store, the system comprising:
- a retail display space in the retail store;
- an inventory station in an inventory area of a retail store, the inventory area being an area where products are stored;
- a first communications device that:
  - receives an electronic request for a product sent from a second communications device operated by a customer, the electronic request being associated with a request-specific identifier created by the customer at the second communications device for the electronic request;
  - determines an order status for the electronic request at the inventory station; and
  - responsive to the electronic request and based on the order status, the first communications device of the inventory station sends an order confirmation directed to the second communications device operated by the customer acknowledging the electronic request, and directing the customer to proceed to a designated pick up point for the product if the product is located within the inventory;
- a point of sale device located within the retail store that:
  - following the order confirmation, receives the request-specific identifier;
  - adds the product to a transaction for purchase by the customer based on the request-specific identifier received at the point of sale device; and
  - completes the purchase of the product.

6. The method of claim 1, wherein the customer is an in-store customer and the second communications device is located within the retail store.

7. The method of claim 1, further comprising:
sending the electronic request from the second communications device to the first communications device.

8. The system of claim 5, wherein the customer is an in-store customer and the second communications device is located within the retail store.

9. The system of claim 8, further comprising the second communications device.

10. The system of claim 5, further comprising:
a communications link that enables the second communications device operated by the customer within the retail display space to communicate directly with the first communications device of the inventory station as part of receiving the electronic request.

* * * * *